Figures 1, 2, 4:
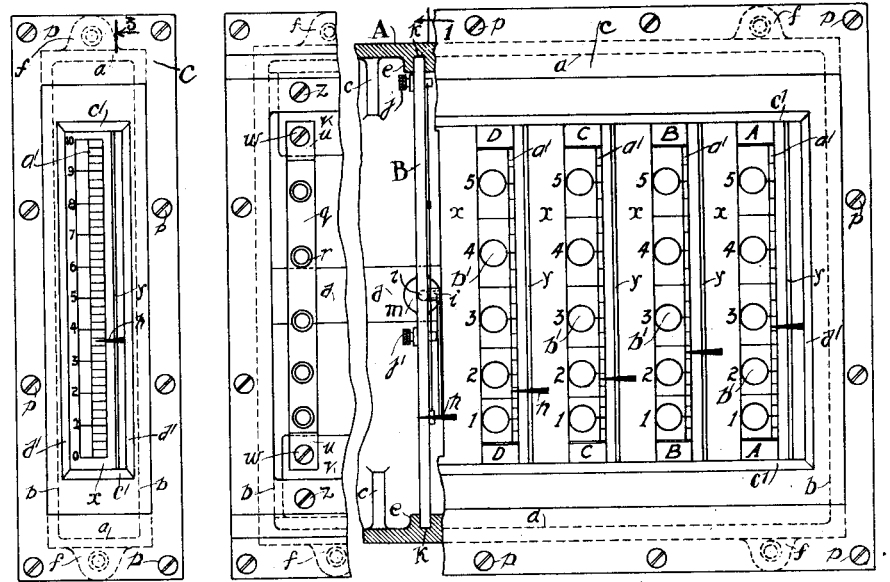

G. BLOCH.
COMPARTMENT OR BULKHEAD LEAKAGE INDICATOR FOR SHIPS AND THE LIKE.
APPLICATION FILED DEC. 30, 1912. RENEWED AUG. 26, 1916.

1,199,340.

Patented Sept. 26, 1916.
4 SHEETS—SHEET 1.

Witnesses
A. H. Holman
P. P. Crampton

Inventor
George Bloch.

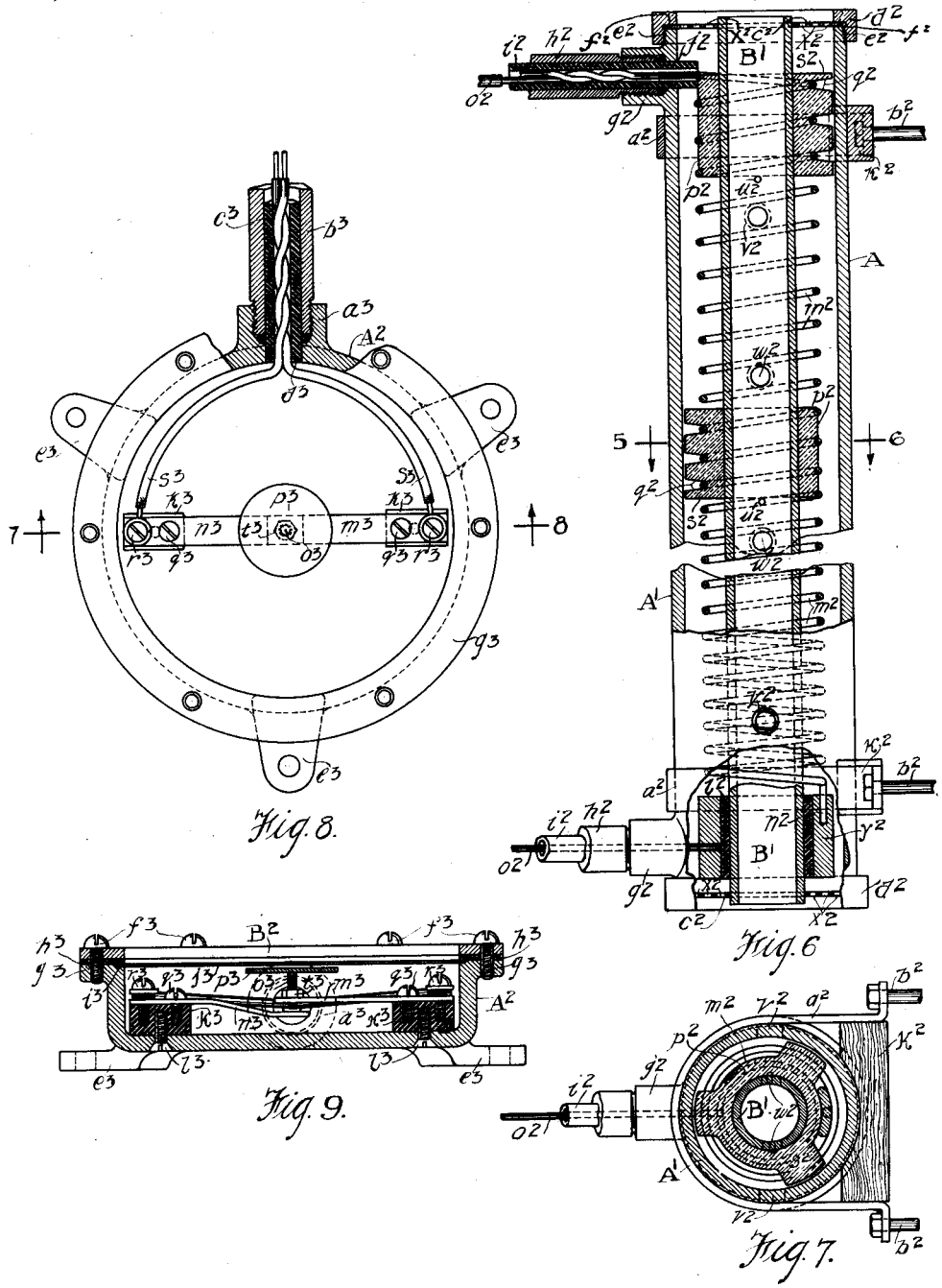

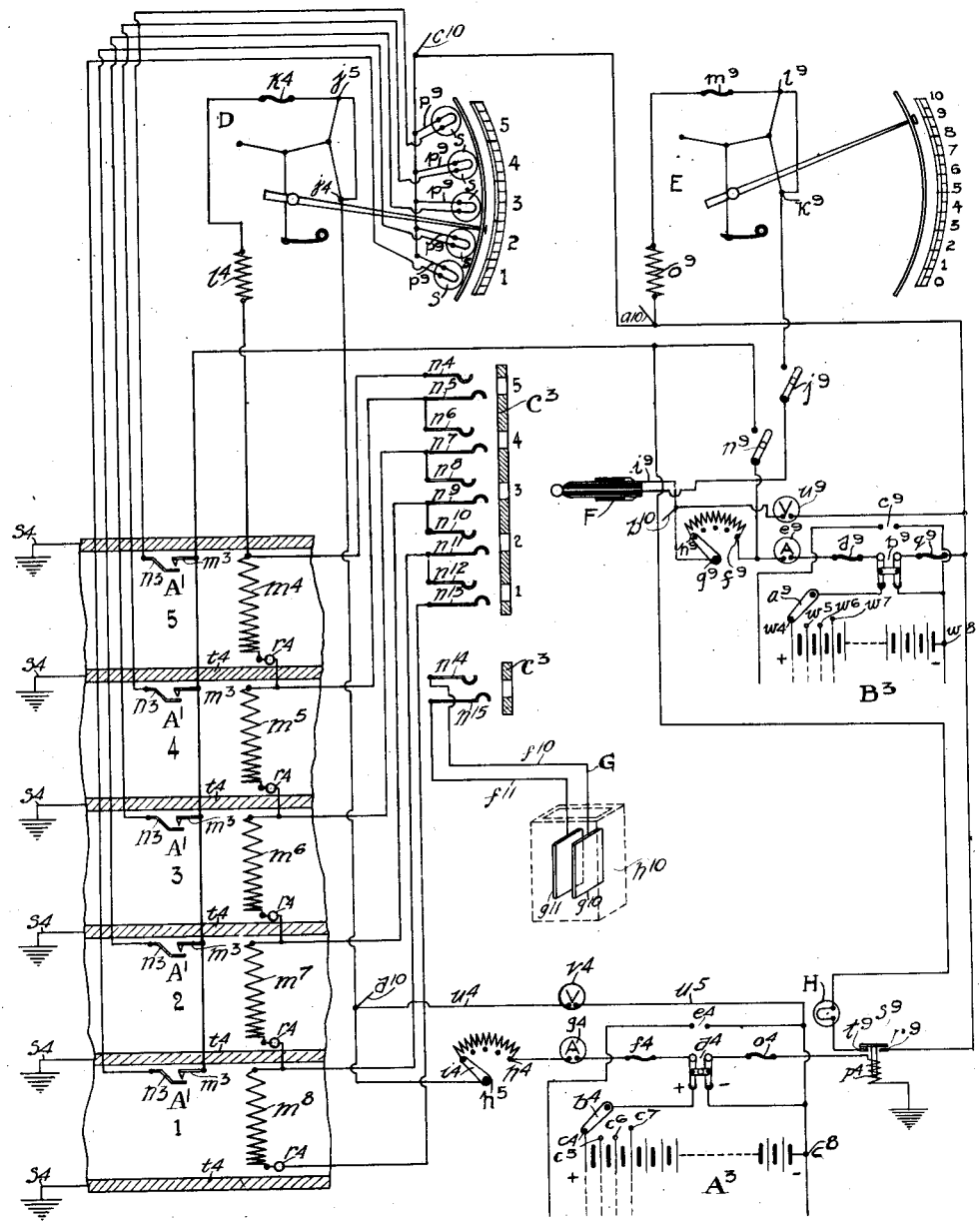

UNITED STATES PATENT OFFICE.

GEORGE BLOCH, OF MILWAUKEE, WISCONSIN.

COMPARTMENT OR BULKHEAD LEAKAGE INDICATOR FOR SHIPS AND THE LIKE.

1,199,340.     Specification of Letters Patent.     Patented Sept. 26, 1916.

Application filed December 30, 1912, Serial No. 739,200. Renewed August 26, 1916. Serial No. 117,078.

*To all whom it may concern:*

Be it known that I, GEORGE BLOCH, residing at Milwaukee, Wisconsin, subject of the Emperor of Germany, have invented a new and useful Improvement in Compartment or Bulkhead Leakage Indicators for Ships and the like, of which the following is a specification.

My invention relates to indicators for ships and the like, in which there are a number of longitudinally or transversely divided bulkheads or both, and has for its object to provide a quick and reliable means whereby the height and rate of incoming water in one or all compartments or bulkheads when damaged by collison or otherwise, may be readily ascertained.

In order to carry my invention into effect, I have made use of such well known instruments as the hot-wire current meter, ammeter, voltmeter and other such apparatus essential to electric circuits in common.

My invention consists primarily in installing in the various compartments of vessels, and the like, considered water-tight compartments or bulkheads, resistances of known capacity, preferably in series electrically connected in common with suitable current meters, preferably hot-wire current meters, hereafter spoken of as indicators, situated on a switchboard located in the chart room or other suitable place within the proximity of the navigating bridge, admitting ready access to the officers thereon.

The above mentioned indicators have their scales graduated in equal divisions of standard measurement for each of the successive compartments or bulkheads, commencing with the lowest or first from the keelson of the ship, and continuing upward to include the whole of the compartments situated immediately above between decks for a suitable distance above water. It will be understood that the adjoining compartments on each successive deck are in no way connected with each other by my invention; but only those immediately below and above. If it is necessary to include adjacent compartments on the successive decks they must be wired in a similar manner separately to the switchboard.

Modifications may be variously employed without departing from the spirit of the invention, and will of necessity be governed by the particular construction and internal subdivision or multiple subdivision of the ship.

As previously mentioned, and by way of example only, I have included the double bottoms of the vessel as constituting my first or lowest compartment.

For each of the successive compartments or bulkheads situated immediately and horizontally above each other, or otherwise disposed, I have provided a small incandescent lamp, located adjacent to the indicator scale on the switchboard, coinciding with the depth of the said compartment, and in metallic connection with an elastic pulsating diaphragm, secured to the underside of each deck, or the like, in each compartment or bulkhead, so that on any one or more becoming flooded to their capacity, the inertia of the incoming water impels the elastic diaphragm inward making contact, which closes an electrical circuit lighting the above mentioned lamps.

In order to increase the utility of my invention, I have provided upon the aforesaid switchboard two additional or supervisory indicators, located at suitable positions corresponding relatively with the respective sides of the vessel, so that they are separate and distinct from the previously mentioned indicators.

The said indicators may be alternately bridged across the resistances of any one compartment or bulkhead relative thereto, by means of correspondingly individual contact springs, and the height and progress of the incoming water at any instant accurately determined therefrom in standard measurement. In order to determine the equivalent rise of water corresponding to a unit interval of time, I have provided stop clocks located below the said indicators.

I have further provided upon the switchboard preferably centrally thereon a signal lamp, which lights upon the first entry of water in any compartment or bulkhead, the metallic circuit connected thereto receiving power from a battery or generator. This circuit remains open so long as there is no water in the various compartments; but closes immediately water finds its way into any one or more compartments or bulkheads as previously mentioned.

In operation the current from a battery or power generator, passes through the serially connected resistances, and the corresponding indicator or indicators relative to the various compartments or bulkheads. This circuit remains open as previously mentioned, until the entry of water which forms a ground return by the conductivity of the current through the water and the iron of the ship, and thence through a relay which closes an independent circuit, the power of which is derived from a battery or power generator, lighting the previously mentioned signal lamp. We now have a complete circuit through the indicator or indicators, the registration of which corresponds to the height of water in the compartment or compartments.

The specific electrical resistance of sea water is approximately 30 ohms per cubic centimeter, and to make a good contact with the iron of the ship, and to overcome the comparatively high resistance of the sea water, I have provided two metal pipes of suitable diameter with openings therein to allow the entry of sea water. External to the inner pipe are porcelain insulators of intermediate lengths secured thereto, commencing at a suitable distance upward from the underside of the said metal inner pipe. Upon these intermediate porcelain insulators are spiral grooves, in which the metallic resistances are correspondingly wound, the whole being housed within an external metal pipe suitably perforated in like manner to the internal pipe, and secured to the vertical side of the compartment or bulkhead by a strap encircling the said external pipe, or other suitable fastening.

Within the space provided as previously explained, between the underside of the lower porcelain insulator, and that of the internal pipe, and secured to the latter; but insulated therefrom, I have provided a metal ring in electrical contact with the lower terminal of the resistances of the compartments, of diameter somewhat less than the external pipe or housing, this ring which is also connected with the upper terminal of the adjacent lower resistance, serves by reason of its relatively large area as a collector of the current passing from the resistance to the collector, and through the water to the external or grounded pipe secured to the vertical side of the compartment or bulkhead.

It will be readily understood, that immediately the water entering the compartment comes in contact with this ring a closed circuit is formed, and as the water rises in the compartment and also within the housing and internal pipe through the openings provided, surrounding the resistance therein, the current from the resistance has two ways of a grounded return, that of its metallic connection with the ring as previously explained, and through the water directly to the external and grounded pipe, secured to the vertical side of the compartment or bulkhead.

As the water increases in height the resistance of the metallic line to a flow of electric current varies, and the pitch of the resistances, or the number of spiral windings per unit length, may be made relative thereto in accordance with the fundamental principle of electrical laws.

The contact springs are mounted flush with the outer surface of any suitable insulation, and are commonly known as jack strips, detachably secured to the front of the switchboard below the indicators. The springs or jacks per strip may consist of any convenient number corresponding to the various compartments of the vessel, and numerically designated in like manner to the indicators above.

A plug and plug seat are located below the previously mentioned jack strips, to the tip and sleeve of the former of which is connected a battery and the aforesaid supervisory indicators.

The insertion of the plug in a jack numerically corresponding to any compartment or bulkhead, closes that circuit, allowing a current to flow from the battery through the plug and the resistance of that compartment, returning to the battery once more through the plug and indicator, completing the circuit.

The height of water in the compartment will as previously mentioned determine the resistance of the metallic line, and as the water decreases or increases in height, the resistance to a flow of electric current becomes more or less respectively.

The indicator will be effected by, and will actually register the resistance, which upon the scale thereof is equivalent to equal divisions of the compartment in standard measurement. In the annexed drawings I have preferred to show the divisions in feet.

Although the conductivity of sea water varies with temperature and the percentage of salt present, its influence upon the flow of electric current through the resistances of the compartments is so small that it can be practically neglected. In order that actual tests may be made taking 30 ohms as the standard resistance for comparison, I have provided a testing set, consisting of a receptacle for the sea water and two electrodes placed therein, the said electrodes are electrically connected separately to a jack located upon the switchboard. The plugs of either supervisory indicators may be used to complete the circuit, and the difference in the registration from the standard of 30 ohms determined therefrom.

The distance apart of the electrodes is found by experiment and remains constant.

The usual apparatus in use for the measurement of the resistance of liquids may be advantageously employed.

The power employed for my invention may be alternating or direct current, and in the drawings attached hereto I have preferred to use direct current supplied from two batteries. The wiring of the resistances of the compartments and the indicators other than the supervisory indicators, and also the magnet of the relay previously mentioned, are common to one battery as follows: The top terminal of the resistance of the uppermost compartment is wired direct to a constant resistance, and thence through a fuse to a terminal of the indicator, across the terminals of the indicator I have shown a shunt although this is not essential. The opposite terminal of the said indicator is wired direct to the movable contact of a rheostat, and thence through an ammeter and fuse to a contact of a double pole switch. The make and break contact of the said switch is wired to the movable contact of the end-cell switch on the positive side of the battery. The negative side of said battery is grounded to the iron of the ship through the adjacent contacts of the double pole switch, fuse and winding of the said magnet. A voltmeter is interposed between the negative side of the battery and the movable contact of the rheostat. A terminal of each of the indicators other than the supervisory indicators is common to the said movable contact of the rheostat.

The positive side of the second battery is connected to the contacts of the end-cell switch. The movable contact of the said end-cell switch is wired to a make and break contact of a double pole switch through a fuse, ammeter and rheostat, the movable contact of which is connected to the sleeve of a plug. The tip of the said plug is wired to a switch the contacts of which are interposed between the poles of the previously mentioned double pole switch of the first battery, mechanically arranged that the "breaking" of the latter "makes" with the preceding one and visa versa. The said interposed switch is wired direct to a terminal of the supervisory indicator, across the terminals of the said indicator I have shown a shunt although this is not essential. The opposite terminal of the said indicator is wired through a fuse and constant resistance, a second fuse and the adjacent negative contacts of the double pole switch to battery. A voltmeter is interposed between the negative side of the battery and the movable contact of the rheostat. The negative side of the said battery is also connected common to a terminal of each of the incandescent lamps of the indicators other than the supervisory indicators, which have no lamps.

Between a terminal of the ammeter and that of the rheostat is a lead wired to a switch common to one terminal of each of the elastic pulsating diaphragms. The opposite terminal of the said diaphragms are separately wired to the opposite corresponding terminals of the said lamps. The lead common to one terminal of each of the diaphragms is also wired direct to a terminal of the pilot lamp. The corresponding opposite terminal of said lamp is connected to a contact of the previously mentioned relay. The corresponding opposite terminal of the said relay is wired to the negative contacts of the double pole switch of the second battery.

Both supervisory indicators are connected electrically through the terminals of their constant resistances nearest the negative side of the battery, and the sleeve of both plugs through the movable contact of the rheostat of the second battery.

In order to recharge the batteries, the negative side and the terminals of the end-cells, are separately wired direct to a power board and connect with the feeding generator in the usual manner. If it is desired to use the power direct from the generator and cut out the batteries as a power source, the double pole switch of the respective batteries previously mentioned are thrown over to their coinciding contacts which connects with the feeding generator.

The lower terminal of the first resistance commencing with the lowest compartment or bulkhead, is wired direct to the corresponding spring contact or spring jack of said compartment. The adjacent spring jack of the said lower compartment is wired to the spring jack of the second compartment, situated above the said lower compartment, and also to the top terminal of the said lower resistance. The lower terminal of the resistance of the second compartment is connected electrically to the top terminal of the resistance of the said lower compartment, this process being a multiple for each of the successive compartments.

The top terminal of the resistance of the uppermost compartment is wired direct to the adjacent spring jack of the said upper compartment.

It will be understood that all wiring including that between the terminals of the adjacent resistances of the compartments is suitably insulated copper wire of requisite size, and that only the wiring of the resistances between their respective terminals are non-insulated, and may be made of any suitable material.

The indicators of the "starboard" side of the vessel are located to the right of the switchboard looking forward, and those of the "port" side to the left; both groups of indicators are separately mounted upon the said switchboard together with their respective jacks or contact springs. In the intervening space between the respective groups of jacks and the above indicators, are preferably located the previously referred to signal lamp, and the spring jack of the testing set.

The color of the signal lamp would preferably be white, those of the indicators of the "starboard" side green and of the "port" side red.

The apparatus upon the switchboard is suitably designated by plates adjacent thereto attached to the front of the board.

Reference will now be had to the following drawings in which like letters of reference refer to corresponding parts throughout the several views.

Figure 5:
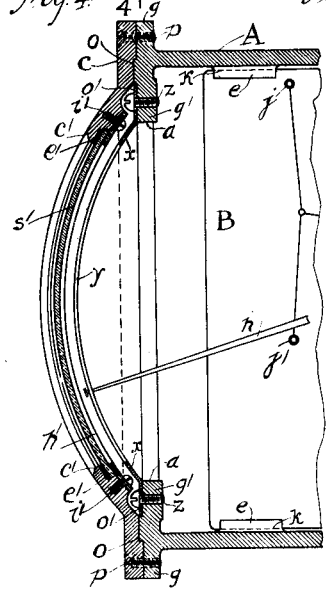
Figure 3:
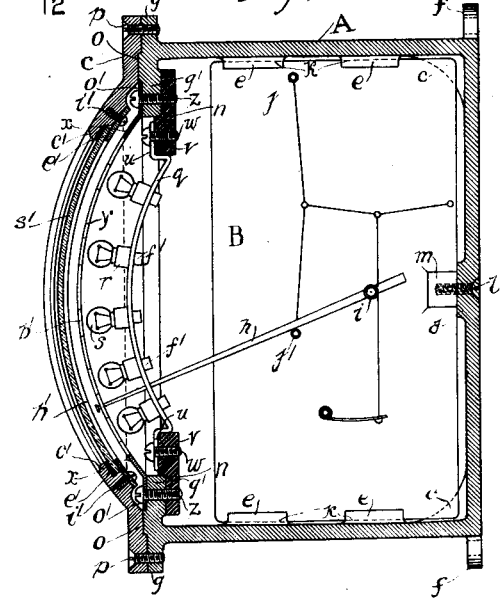
Figure 11:
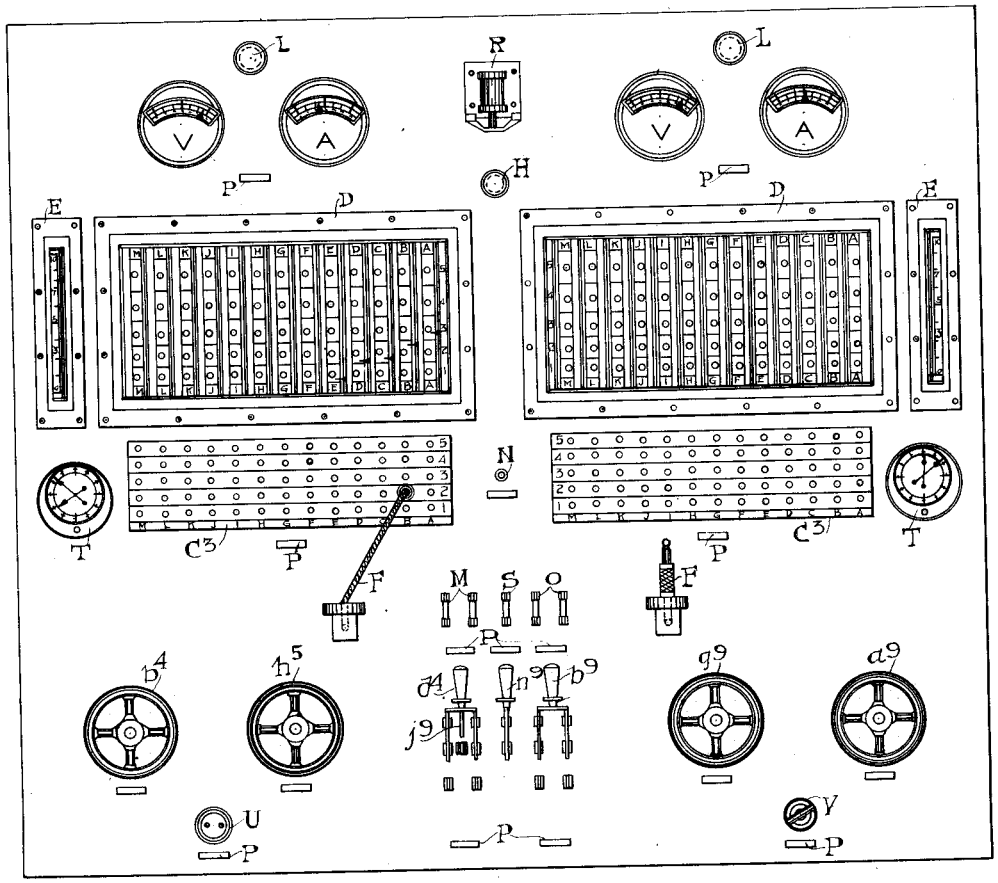

Figure 1 is a front elevation of the indicators and housing, showing portions broken away to more clearly illustrate the construction; Fig. 2, a partial elevation of same with front cover removed therefrom; Fig. 3, a cross section of same on lines 1—2 looking in direction of arrows; Fig. 4, a front elevation of the supervisory indicator and housing; Fig. 5, a cross section of same on lines 3—4; Fig. 6, an elevation part in section of the external housing and internal pipe; porcelain insulators, resistance and the wiring therefrom through its conduit; and strap and bolt for securing the whole to the vertical side of the compartment or bulkhead; Fig. 7, a cross section of same on lines 5—6; Fig. 8, a front elevation of the elastic pulsating diaphragm contact device the cover and diaphragm being removed for the sake of clearness; Fig. 9, a cross section centrally therethrough on lines 7—8 showing the cover and diaphragm in position; Fig. 10, a diagrammatical wiring plan of the whole device; and Fig. 11, a front elevation of the switchboard with the apparatus assembled thereon.

The exterior casing A, is preferably a casting of any suitable material such as brass or gunmetal, and has a rectangular portion of its front removed between the points $a$—$a$ and $b$—$b$. Within and adjacent to the rear side of the upper and lower portions are webs $c$, longitudinal shoulder $d$, and guides $e$, integral with the said outer casing. At the front and rear side of the top and bottom exterior surfaces are lugs $f$, for securing to the switchboard at the rear, and the rightangular outwardly projecting edges $g$, integral with the said outer casing A.

The indicator arm $h$, (Figs. 3 and 5) of the hot-wire current meter is pivoted at $i$, on the mounting B, which may be of any suitable material and the terminals $j$ and $j^1$, insulated therefrom in the usual manner as will be readily understood by those skilled in the art to which my invention belongs.

Any suitable current meter may be advantageously employed, that shown in the drawings forming no part of my present invention.

The mounting B, is adapted to and bearing in the grooves $k$, of the guides $e$, and secured to the longitudinal shoulder $d$, of the inner and rear side of the outer casing A, by screws $l$, threaded for reception within the correspondingly screwed holes of the substantially large circular portion $m$, integral with the said mounting B.

The lamp mounting $q$, consists of metal strips in which a number of apertures are formed to receive the sockets $r$, of the lamps $s$, said sockets are preferably soldered to the lamp mounting, and the contact plugs $f$, screwed in the lamp sockets at the rear in opposition to the lamps making contact therewith; but insulated from the lamp sockets. The said lamp mounting is substantially quadrantal of radius equaling the distance to the pivot $i$ see Fig. 3, the extremes $u$, are bent back right angularly and outward tangentially to the said radial portion and bearing in compression on the opposite lateral surface of the insulation $v$, secured to the front thereof by the screws $w$. The said insulation $v$, is in turn assembled to the inner lateral surface of the flange $g^1$, within the corresponding longitudinal recess $n$, of the said insulation. In front of the said lamp mounting and concentric thereto is the plate $x$, within the slots $y$, of which are the indicator arms $h$, adjacent to the scales $a^1$, within the precinct of which are the apertures $b^1$, in precedence to the lamps $s$. The said plate is secured to the outer surface of the inner flange $g^1$, in the recess $o^1$, of the casing A, by the screws $z$, threaded for reception within the adjoining holes of the insulation $v$.

The cover C, (Figs. 3 and 5) concentric to the plate $x$, is preferably of the same material as the casing A, of depth relatively corresponding to the projecting edges $g$, of the said casing A, and with a longitudinal recess $o$, adapted to receive a corresponding; but reversibly disposed projection of the outer surface of the casing A, secured thereto by the counter sunk screws $p$, threaded for reception within the adjoining screwed holes of the projecting flange $g$, of the outer casing A.

Between the points $c^1$—$c^1$, and $d^1$—$d^1$, the exterior detachable cover C, is open and the limiting edges thereof partially beveled. At the inner and concave side of the cover C, in recedence to the beveled edges is a recess comprising the sides bounding the said opening; but of relatively deeper area in which is a soft suitable material $e^1$, to form a seating for the radial glass protection screen $s^1$, retained in position by the substantially smaller rectangular frame $h^1$, secured to the inner side of the exterior cover C, by the screws $i^1$. The upper and lower terminating edges of the said frame are recessed back in combination with the inner surface of the cover C, to a point coinciding with the limiting edges of the plate $x$, in clearance of the screws $z$.

The exterior housing $A^1$, (Figs. 6 and 7) is preferably a gas pipe of say two inches in diameter and in length is nearly equal to the height of the compartment or bulkhead, positioned vertically therein, and secured to the side thereof against the block $k^2$, by the straps $a^2$, and bolt $b^2$, or other suitable fastening. Within the said housing is the inner pipe $B^1$, of relatively small diameter say half-inch, positioned centrally therein by plates $c^2$, adapted to receive the ends of the inner pipe $B^1$, which may be turned down to smaller diameter to form a shoulder and admit the prizing on of the plates $c^2$, or they may be made sufficiently heavy and threaded for reception on a correspondingly screwed portion of the inner pipe $B^1$.

The plates $c^2$, are retained in position by overlapping the ends of the housing $A^1$; but of smaller diameter to admit the ring $d^2$, threaded in the annular recess $e^2$, for reception on the correspondingly screwed end of the housing $A^1$, securing the said plate $c^2$, firmly between the ends of the housing $A^1$ and the shoulder $f^2$, of the inner annular screwed recess $e^2$, of the ring $d^2$. Adjacent to the said ring and at right angles to the housing $A^1$, are the nipples $g^2$, screwed to the housing or integral therewith, threaded within for the reception of the correspondingly screwed conduit $h^2$, see Fig. 6, and the insulation $i^2$, therein projecting through an aperture $j^2$, of the housing $A^1$, alined with the said insulation.

At a suitable distance upward from the underside of the inner metal pipe $B^1$, is located the metal ring collector $y^2$, tightly fitted to the insulation $l^2$, prized on the said pipe $B^1$. The resistance $m^2$ is in metallic connection with the said collector at the point $n^2$, and also the lead $o^2$, of the top terminal of the next lower resistance of the compartments as previously mentioned.

Equidistant upon the inner pipe $B^1$, are the porcelain insulators $p^2$, comprising a circular body enlarging outward to a substantially larger disposed longitudinal traverse projection $s^2$, integral with the said insulator. Upon these intermediate insulators are spiral grooves $q^2$, in which the metallic resistances are correspondingly wound and so supporting the insulators in position; although in the annexed drawings I have shown pins $u^2$, screwed at the underside of the said insulators to the inner pipe $B^1$, for supporting the same.

In the housing $A^1$, are apertures $v^2$ and $w^2$, of the inner pipe $B^1$, alined therewith to allow the sea water to reach the resistance, and also in the plates $c^2$, are apertures $x^2$, for the purpose described.

$A^2$ designates the circular body or casing of the elastic pulsating contact device (Figs. 8 and 9) which is preferably a casting in any suitable metal; and $a^3$, a substantially circular outwardly disposed projection integral with the said body, screwed on the inside for the reception of the complementary threaded pipe $b^3$ and insulation $c^3$ thereof, through the aperture $d^3$, flush with the inner vertical side of the body $A^2$. At the underside of the said body adjacent to the vertical sides are lugs $e^3$, for securing to the underside of the compartment or bulkhead.

The cover $B^2$, of the casing $A^2$, is secured thereto by the screws $f^3$, threaded for reception within correspondingly screwed holes of the outwardly projecting circular flange $g^3$; between the said flange and the said cover is a rubber ring $h^3$, with apertures to admit said screws, so that when said cover is tightly secured to said flange by said screws; the circular casing is rendered watertight.

Upon the inner side of the upper lateral surface of the casing $A^2$, adjacent to the flange is an annular recess $i^3$, in which a correspondingly circular elastic diaphragm $j^3$, is retained by pressure of the cover $B^2$, upon the rubber ring $h^3$, on the said diaphragm, when the cover $B^2$, is positioned and secured to the casing $A^2$, by the screws $f^3$.

Upon the inner surface of the underside of the casing $A^2$, alined with the center and adjacent to the inner vertical sides thereof are substantially rectangular insulation blocks $k^3$, of requisite size secured thereto from the underside of the casing $A^2$, by the counter-sunk screws $l^3$. Upon the upper surface of the said blocks are metal contact springs $m^3$ and $n^3$, reversibly disposed, extending inward beyond the center of the said casing $A^2$; the former contact spring is substantially straight, while the latter inclines downward from a point removed from its insulation sufficient to bring it a suitable distance beneath the straight contact spring $m^3$, it is then bent relatively straight and parallel to the said straight contact spring.

Upon the previously referred to contact spring virtually over the center of the circular casing $A^2$, is a screwed hole for the reception of the complementary threaded shank $o^3$, integral or firmly secured to the circular disk $p^3$ and nut $t^3$, engaging the contact spring $m^3$, in compression in opposition to the shank; an additional nut may be screwed to the said shank at the underside of the said contact spring if desired, to insure a perfectly rigid fastening, the latter method would be preferable, for owing to the thinness of the straight contact spring in order to make it sufficiently flexible to be actuated by the undulations of the diaphragm $j^3$, a screwed hole therein would not be sufficient with the threaded nut $l^3$, to retain the disk $p^3$, borne by the shank $o^3$ in position.

The contact springs are secured to the insulation by screws $q^3$; and partially by screws $r^3$, which are terminals of the leads $s^3$.

$A^3$ (Fig. 10) designates the battery common to the resistances of compartments numbered 1 to 5; and the indicators D first referred to in a prior part of the specification. At the positive side of the said battery is an end-cell switch $b^4$ and terminals $c^4$, $c^5$, $c^6$ and $c^7$ of the end-cells and $c^8$, of the opposite negative side, wired direct to a power board and connect with the feeding generator in the usual manner. The switch $b^4$ and the negative side of the said battery connect with the relative contacts of the double pole switch $d^4$; the coinciding contacts $e^4$ with the feeding generator cutting out the battery as a power source when "making" with the switch $d^4$. The positive adjacent contact of the latter switch is wired to a fuse $f^4$ thence through an ammeter $g^4$ to fixed contact $h^4$ of rheostat $h^5$; and movable contact $i^4$ of same to terminal $j^4$ of the indicator D. The opposite terminal $j^5$ of said indicator is connected to fuse $k^4$, resistance $l^4$ and top terminal of resistance $m^4$ of compartment number 5. The latter terminal of the foregoing resistance is also connected direct to the spring jack $n^4$ of the switchboard $C^3$; the adjacent spring jack $n^5$ of compartment number 5 to the top terminal of resistance $m^5$ of compartment number 4; and lower terminal of resistance $m^4$ with the top terminal of resistance $m^5$; and spring jack $n^5$ to that of $n^6$ of compartment 4. This process is the same for each compartment, except, that in a similar manner to compartment number 5; the lower terminal of resistance $m^8$ is connected direct with the spring jack $n^{13}$.

The negative side of the double pole switch $d^4$, is wired to fuse $o^4$ and winding $p^4$ of relay to ground.

Between the terminals of the adjacent resistances $m^4$ to $m^8$, is the metal ring collector $r^4$; and the ground return $s^4$ through the iron of the ship when water makes contact with the said ring $r^4$ and sides $t^4$ of compartments 1 to 5. Between the negative side of the battery $A^3$ and the contact $i^4$ of rheostat $h^5$; and terminal $j^4$ of indicator D are the leads $u^4$ and $u^5$ of the voltmeter $v^4$.

$B^3$ designates the second battery common to the plug F, supervisory indicators E, testing set G, pilot lamp H and indicator lamps $s$; and $w^4$, $w^5$, $w^6$ and $w^7$, terminals of the end cells of the positive side; and $w^8$ of the negative side of the said battery, wired to a power board and connect with a feeding generator in the usual manner. The switch $a^9$ and the negative side of the said battery connect with the relative contacts of the double pole switch $b^9$ the coinciding contacts $b^9$ connect with the feeding generators cutting out the battery as a power source when "making" with the switch $b^9$. The positive adjacent contact of the latter switch is wired to a fuse $d^9$ thence through an ammeter $e^9$ to fixed contact $f^9$ of the rheostat $g^9$; and movable contact $h^9$ of same to sleeve of plug $i^9$.

The tip of the plug F, is wired to the switch $j^9$ which is in reality interposed between the contacts of the double pole switch $d^4$ of battery $A^3$, mechanically arranged that the "breaking" of the latter "makes" with the preceding one, and vice versa. The relative contact of the said switch $j^9$ is wired to terminal $k^9$ of the supervisory indicator E: the opposite terminal $l^9$ of same to fuse $m^9$: and resistance $o^9$ joined to lead common to terminals $p^9$ of the lamps $s$.

Between the terminal $f^9$ of the rheostat $g^9$ and the ammeter $e^9$, is a switch $n^9$ wired common to terminal of straight contact springs $m^3$ of the diaphragm contact device $A^1$ of compartments 1 to 5.

The negative side of the battery $B^3$ connects with the like contacts of switch $b^9$, through fuse $q^9$ to terminal of resistance $o^9$ common to terminals $p^9$ of lamps $s$; and also to contact $r^9$ of armature $s^9$ of the relay. The opposite contact $t^9$ of the said armature connects with the pilot lamp H and thence joined to the lead common to the contact springs $m^3$ of the diaphragms $A^1$ between the switch $n^9$ and terminal $m^3$ of compartment number 5.

Between the negative side of the battery and the sleeve $i^9$ of the plug F, is joined the leads of the voltmeter $u^9$. The contact springs $n^3$ of compartments 1 to 5 are separately wired to the corresponding opposite terminals of the lamps $s$.

$C^3$ designates the jack mounting on the front of the switchboard; and $n^{14}$ and $n^{15}$ the spring jack of the testing set G; $f^{10}$ and $f^{11}$ are the leads to the electrodes $g^{10}$ and $g^{11}$ of the receptacle $h^{10}$.

The supervisory indicators E of the "starboard" side of the vessel are electrically connected to those of the "port" through the lead $a^{10}$ of the constant resistance $o^9$ nearest the negative side of the battery $B^3$; the sleeve of both plugs F through leads $b^{10}$ of the movable contact $h^9$ of the rheostat $g^9$; the lamps $s$ through lead $c^{10}$ common to terminals $p^9$ thereof; and indicators D through lead $d^{10}$ joined to wiring between terminals $j^4$ of indicator D and $i^4$ of rheostat $h^5$.

D designates the indicators (Fig. 11); and E the supervisory indicators; $C^3$ the jack mountings; L the lamps for illuminating the switchboard; R the relay; H the pilot lamp; N the jack of the testing set G; T the stop clocks; F the plugs of the supervisory indicators E; $b^4$ the end-cell switch and $h^5$ the rheostat of battery $A^3$; $a^9$ the end-cell switch and $g^9$ the rheostat of battery $B^3$; $d^4$ the double pole switch of battery $A^3$ and $j^9$ the interposed switch of battery $B^3$; $n^9$ a switch and $b^9$ the double pole switch of battery $B^3$; M the fuses of battery circuit $A^3$ and O the fuses of battery circuit $B^3$; S the fuse of illuminating lamps L and V the switch of same not shown in Fig. 10; U the plug socket of the testing set G and P the designation plates located below the various apparatus.

What I claim and desire to secure by Letters Patent in the United States is:

In an electrically operated watertight compartment leakage indicator system for ships, the combination with a housing formed with a rectangular portion of its front removed; rightangularly outwardly disposed projections at the upper and lower edges oppositely to the inwardly projecting edges of the remaining front portion; a plurality of webs $c$, integral and adjacent to the rear side of the upper and lower inner surfaces; longitudinal shoulder $d$, integral with the said inner rear side, and guides $e$, integral with the inner upper and lower surfaces of the said housing; insulation $v$ having a recess assembled to inner side of the inwardly projecting edges of the said front opening within said recess; means for securing said insulation where described; a lamp mounting $q$, consisting of a plurality of metal strips of concavo-convex shape, the extremes bent back right-angularly and outwardly relative to said radial portion, and overlying the opposite lateral surface of said insulation; apertures formed in said mounting $q$, for reception of lamp sockets $r$, rigidly secured thereto; lamps $s$, assembled in said sockets at the front, and contact plugs $f$ at the rear in opposition to said lamps making contact therewith: but insulated from said lamp sockets; means for securing said mounting $q$, to said insulation $v$; a scale $x$, concentric with said mounting $q$, in precedence to said mounting formed of metal sheet of concavo-convex shape, the terminating edges of same interfitting within recess $o^1$, of an inner projecting flange at front of said housing; said mounting having slots $y$ formed therein so that indicator arms $h$, may circumferentially adjust themselves therein and apertures formed before said lamps, means for securing said mounting to said housing; a detachable cover of partially concavo-convex shape with sides extending outwardly relative to said radial portion, and of a depth relatively corresponding to said projecting edges of said housing; the inner face of the said cover having a recess $o$ to receive a corresponding interfitting projection of the said housing; said cover having a sight opening the limiting edges of the front thereof being partially beveled and of the rear recessed back; a soft material in said recessed portion and a glass protection plate upon said material within said recess; a rectangular metal frame adapted to overlie limiting edges of said glass plate, retaining same firmly in position; the upper and lower edges of said frame, in combination with the inner surface of said cover, to a point coinciding with said scale $x$ presenting a recess, in clearance of the screws $z$; a substantially circular enlarged portion of the mounting B, bearing in the said grooves $e$, means for securing said mounting to said housing, means for securing said frame to said cover, and means for securing said cover to said housing.

GEORGE BLOCH.

Witnesses:
A. H. HOLMAN,
J. J. CRAMPTON.